United States Patent
Tanaka

(10) Patent No.: US 9,676,157 B2
(45) Date of Patent: Jun. 13, 2017

(54) MANUFACTURING METHOD FOR MOLD DIE, MOLD AND EYEGLASS LENS

(71) Applicant: HOYA CORPORATION, Shinjuku-ku, Tokyo (JP)

(72) Inventor: Takao Tanaka, Tokyo (JP)

(73) Assignee: HOYA CORPORATION, Tokyo (JP)

(\*) Notice: Subject to any disclaimer, the term of this patent is extended or adjusted under 35 U.S.C. 154(b) by 583 days.

(21) Appl. No.: 13/850,761

(22) Filed: Mar. 26, 2013

(65) Prior Publication Data
US 2013/0247619 A1 Sep. 26, 2013

(30) Foreign Application Priority Data

Mar. 26, 2012 (JP) .................................. 2012-069197
Apr. 20, 2012 (JP) .................................. 2012-096639

(51) Int. Cl.
*C03B 11/08* (2006.01)
*B29D 11/00* (2006.01)
(Continued)

(52) U.S. Cl.
CPC .. *B29D 11/00951* (2013.01); *B29D 11/00028* (2013.01); *B29D 11/0048* (2013.01);
(Continued)

(58) Field of Classification Search
CPC ................................................. B29D 11/0048
(Continued)

(56) References Cited

U.S. PATENT DOCUMENTS 5,048,945 A    9/1991  Ueno et al.
5,549,855 A *  8/1996  Nakanishi et al. ............ 264/2.5
(Continued)

FOREIGN PATENT DOCUMENTS

EP    1 752 271 A1    2/2007
EP    2 248 646 A1    11/2010
(Continued)

OTHER PUBLICATIONS

Extended European Search Report issued in EP counterpart Application No. 13161041.2 dated Apr. 4, 2014.
(Continued)

*Primary Examiner* — Cynthia Szewczyk
(74) *Attorney, Agent, or Firm* — Sughrue Mion, PLLC

(57) ABSTRACT

A manufacturing method for a mold die comprising: making design data for a molding surface based on predetermined prescription information; creating the molding surface in accordance with the design data; specifying error amounts at first and second corresponding points defined on the created molding surface respectively corresponding first and second reference points; defining a first correction surface based on an error amount specified at the first corresponding point; of defining a second correction surface based on the first correction surface and an error amount specified at the second corresponding point, wherein the second correction surface has no power at the first corresponding point; combining a design surface by the design data, the first correction surface and the second correction surface, and corrects the design data based on combined data after the combining; and creating the molding surface in accordance with the corrected design data.

13 Claims, 5 Drawing Sheets

(51) Int. Cl.
G02C 7/02 (2006.01)
G02C 7/06 (2006.01)
C03B 23/00 (2006.01)

(52) U.S. Cl.
CPC ......... *C03B 11/08* (2013.01); *C03B 23/0026* (2013.01); *G02C 7/024* (2013.01); *G02C 7/061* (2013.01); *G02C 7/068* (2013.01)

(58) Field of Classification Search
USPC .................................................. 264/1.1–3.5
See application file for complete search history.

(56) References Cited

U.S. PATENT DOCUMENTS

| | | |
|---|---|---|
| 6,712,467 B1 | 3/2004 | Kitani |
| 6,832,834 B2 | 12/2004 | Haimerl et al. |
| 6,935,744 B2 | 8/2005 | Kitani et al. |
| 7,188,950 B2 | 3/2007 | Dreher et al. |
| 7,399,080 B2 | 7/2008 | Kitani et al. |
| 7,584,015 B2 | 9/2009 | Ueno et al. |
| 9,242,889 B2 | 1/2016 | Yamakaji et al. |
| 2004/0233385 A1 | 11/2004 | Kitani et al. |
| 2005/0105043 A1 | 5/2005 | Dreher et al. |
| 2007/0043463 A1* | 2/2007 | Ueno et al. ..................... 700/98 |
| 2007/0182923 A1 | 8/2007 | Kitani et al. |
| 2008/0042307 A1 | 2/2008 | Ueno et al. |
| 2009/0108477 A1 | 4/2009 | Yamakaji et al. |
| 2011/0304064 A1 | 12/2011 | Taguchi et al. |
| 2012/0007262 A1* | 1/2012 | Sakata et al. .................. 264/2.5 |

FOREIGN PATENT DOCUMENTS

| | | |
|---|---|---|
| EP | 2 298 706 A1 | 3/2011 |
| JP | 3-46617 A | 2/1991 |
| JP | 4-275930 A | 10/1992 |
| JP | 6-130333 A | 5/1994 |
| JP | 2004-126256 A | 4/2004 |
| JP | 2005-104093 A | 4/2005 |
| JP | 2006-56246 A | 3/2006 |
| JP | 2007-511796 A | 5/2007 |
| JP | 2008-221720 A | 9/2008 |
| JP | 2010-76402 A | 4/2010 |
| WO | 00/62116 A1 | 10/2000 |
| WO | 2005/066696 A1 | 7/2005 |
| WO | 2005/115712 A1 | 12/2005 |
| WO | 2007/058353 A1 | 5/2007 |
| WO | 2009/096085 A1 | 8/2009 |

OTHER PUBLICATIONS

Japanese Office Action issued in corresponding Japanese counterpart Application No. 2013-059765 issued Oct. 17, 2016.

* cited by examiner

MANUFACTURING METHOD FOR MOLD DIE, MOLD AND EYEGLASS LENS

CROSS-REFERENCE TO RELATED APPLICATION

This application claims priority under 35 U.S.C. §119 from Japanese Patent Applications Nos. 2012-069197, filed on Mar. 26, 2012 and 2012-096639, filed on Apr. 20, 2012. The entire subject matter of the applications is incorporated herein by reference.

BACKGROUND

Technical Field

The present invention relates to a manufacturing method for a mold die used for forming a mold by a thermally drooping molding method, a manufacturing method for a mold by the thermally drooping molding method, and a manufacturing method for an eyeglass lens by the mold.

Related Art

A glass mold for an eyeglass lens is formed using a mold die having heat resistance produced through a mechanical grinding and polishing process, a mechanical grinding process or an electric process, such as, electric discharge machining. Specifically, a glass mold for an eyeglass lens is obtained by heating and softening a glass material while letting the glass material contact a mold die, and by transferring a surface shape of the mold die to the glass mold. The mold die is produced by using, for example, a grinding program, for each desired surface shape.

Recently, a demand for a progressive power lens having a progressive power property, such as a near-near progressive power lens, an intermediate-near progressive power lens and a distance-near progressive power lens of a one side aspherical surface type, a double side aspherical surface type or a double side combination type, and a lens of a type similar to the progressive power lens is increasing. As a mold forming method for obtaining an eyeglass lens having a complicated free-form surface of this type, a thermal drooping molding method has been proposed as described, for example, in Japanese Patent Provisional Publications Nos. HEI 6-130333A and HEI 4-275930A. According to the thermal drooping molding method, glass material made of thermosoftening material such as glass is placed on a mold die and is softened to closely contact the mold die by being heated to a temperature higher than or equal to the softening point, so that a molding surface shape of the mold die is transferred to an upper surface of the glass material. As a result, a mold having a desired surface shape is formed.

With regard to the thermal drooping molding method, a plurality of factors including a molding surface shape of a mold die, a shape of glass material, a distance between a molding surface and a lower surface of the glass material and a heating condition could affect the molding precision. Typically, in order to ease the shape control, the molding condition is determined by fixing some of the factors and setting the other of the factors to be changeable. In general, a number of glass materials and mold dies having different shapes are prepared, and a combination of a glass material and a mold die is selected so that the distance between a molding surface and the glass material has a predetermined value (generally, the distance between geometrical centers thereof is 0.1 mm-2.0 mm). Then, preliminary molding is repeatedly performed to make a correction to the shape of the mold die, and thereafter regular molding is performed.

SUMMARY OF THE INVENTION

In general, a mold die is designed based on prescription information by a predetermined design program, and is processed using a processing machine. Then, an error amount with respect to a design value is measured for each of evaluation points of a molding surface. If an error remains at each evaluation point, the measured data is fed back, and the mold die is redesigned. The redesigned mold die is processed using the processing machine, and an error amount with respect to the re-design value is measured at each evaluation point. These processes are repeated until the error amount at each evaluation point falls within a tolerance. That is, the mold die is formed by make an alteration to the design data itself while repeating trial and error.

However, there is a case where information not relating to intended design data (design data mathematically expressing the shape of a molding surface), such as an accidental manufacturing error, is mixed into the design data. In such as case, a problem arises that an eyeglass lens properly achieving originally intended design cannot be made. Furthermore, there arises a problem that the design data in which such an accidental error is mixed is not proper as a parameter for evaluating the shape of the molding surface of the mold die. Furthermore, if the design data itself is changed to correct errors for all the evaluation points in accordance with the measured data on the design program, the die shape which produces an unintended aberration component at an area departing from the evaluation point may be made, and therefore, regarding a glass mold manufactured using the mold die having such an improper shape, an eyeglass lens having a broken optical property where optical continuity is not maintained may be formed. Furthermore, regarding a lens of a type (a so-called a progressive power lens of a double side combination type) where a progressive power component in the vertical direction is assigned only to a convex surface (an object side surface) and a progressive power component in the lateral direction is assigned only to a concave surface (an eye side surface), it is required to manufacture a pair of mold dies for object side molding and eye side molding having complicated free-form surfaces. Therefore, it is difficult to cause errors to converge speedily at all the evaluation points, and a large degree of load is placed on design for avoiding breaking of an optical property.

The present invention is advantageous in that it provides a manufacturing method for a mold die, a mold and an eyeglass lens suitable for maintaining intended design data and avoiding occurrence of breaking of an optical property.

According to an aspect of the invention, there is provided a manufacturing method for a mold die used in a molding process for obtaining a mold used to form an eyeglass lens having at least first and second reference points and having an area where power continuously changes, wherein, in the molding process, a glass material placed on a molding surface of the mold die is softened by heat to form an upper surface of the glass material by letting a lower surface of the glass material closely contact the molding surface. the manufacturing method comprises: a design data making step of making design data for the molding surface of the mold die based on predetermined prescription information; a molding surface creation step of creating the molding surface in accordance with the design data; an error amount specifying step of specifying error amounts at first and second corresponding points defined on the created molding surface respectively corresponding the first and second reference points, with respect to design values by the design data; a first correction surface defining step of defining a first correction surface based on an error amount specified at the first corresponding point; a second correction surface defining step of defining a second correction surface based on the first correction surface and an error amount specified at the second corresponding point, wherein the second correction surface has no power at the first corresponding point; a design data correction step of combining a design surface by the design data, the first correction surface and the second correction surface, and corrects the design data based on combined data after the combining; and a corrected surface creation step of creating the molding surface in accordance with the corrected design data.

According to the above described configuration, since no alteration by the trial and error is made to the design data, information not relating to intended design, such as an accidental manufacturing error, is not mixed to the design data. That is, the molding surface of the mold die has a shape for which a correction for the error amount is made based on the design data by the intended design (i.e., design data mathematically expressing the shape of the molding surface), and therefore it can be said that the molding surface has the shape suitable for manufacturing of an eyeglass lens according to the intended design. Since no alteration by the trial and error is made to the design data, the design data can be used as an appropriate parameter for evaluating the molding surface shape.

According to the above described configuration, a correction amount for correcting the error amount with respect to the design value is defined, for each of the evaluation points (corresponding points) of the molding surface, as an independent correction surface based on the error amount at each evaluation point. Since each correction surface is defined as a mathematically-defined surface, breaking of the optical property does not occur in the correction shape of the molding surface obtained by combining the correction surfaces. In contrast to the conventional design method in which correction is made to simultaneously satisfy desired prescriptions at a plurality of evaluation points, each correction surface is defined to focus on a correction at a single evaluation point. Therefore, each correction surface can be simply defined without causing breaking of the optical property.

In the second correction surface defining step, the second correction surface may be defined such that: a power at the second corresponding point is defined as a value obtained by subtracting a power at the second corresponding point on the first correction surface from the error amount at the second corresponding point; and the entire second correction surface is offset so that the power at the first corresponding point becomes substantially zero.

In at least one of the first correction surface defining step and the second correction surface defining step, at least one of the first correction surface and the second correction surface may be divided into a first divided correction surface and a second divided correction surface. In this case, the first divided correction surface is defined based the error amount at one of the first and second corresponding points in a vertical direction, the second divided correction surface is defined based the error amount at the one of the first and second corresponding points in a lateral direction. In the design data correction step, the first divided correction surface and the second divided correction surface are combined with the deign surface, in place of the at least one of the first correction surface and the second correction surface.

In the first correction surface defining step, the first correction surface may be defined as a toric surface. In the second correction surface defining step, the second correction surface is divided into the first divided correction surface defined based on the error amount at the second corresponding point in the vertical direction and the second divided correction surface defined based on the error amount at the second corresponding point in the lateral direction.

In the design data correction step, curvature distributions of the design surface, the first correction surface and the second correction surface may be obtained and combined, and the corrected design data may be created as height data at each position on the molding surface with respect to a predetermined reference position based on the combined curvature distribution.

According to another aspect of the invention, there is provided a manufacturing method for a mold, comprising: an arranging step of arranging a glass material on a molding surface of a mold die manufactured according to one of the above described manufacturing methods; and a manufacturing step of softening the glass material arranged on the molding surface of the mold die by heat, forming an upper surface of the glass material by letting a lower surface of the glass material closely contact the molding surface, and manufacturing the mold having a transferring surface for forming an eyeglass lens having an area in which power continuously changes.

According to another aspect of the invention, there is provided a manufacturing method for an eyeglass lens, comprising: a defining step of arranging a pair of molds, at leach one of which is manufactured according to one of the above described manufacturing methods, to face with each other, and defining a cavity by sealing a gap between the pair of molds with a sealing member; an injection step of injecting a lens material liquid into the cavity; a hardening reaction step of causing the lens material liquid injected into the cavity to induce a hardening reaction, and obtaining an eyeglass lens base to which each of transferring surface shapes of the pair of molds is transferred; and a mold release step of releasing the eyeglass lens base, to which each of the transferring surface shapes is transferred, from the pair of molds.

According to another aspect of the invention, there is provided a manufacturing method for a pair of mold dies used in a molding process for obtaining a pair of molds used to form a progressive power lens of a double side combination type in which a progressive power component in a vertical direction is assigned to an object side surface and a progressive power component in a lateral direction is assigned to an eye side surface, wherein the progressive power lens has at least first and second reference points, and wherein, in the molding process, a glass material placed on a molding surface of the mold die is softened by heat to form an upper surface of the glass material by letting a lower surface of the glass material closely contact the molding surface. The manufacturing method comprises: a design data making step of making design data for each of the molding surfaces of the pair of mold dies based on predetermined prescription information; a molding surface creation step of creating each of the molding surfaces of the pair of mold dies in accordance with the design data; an error amount specifying step of specifying error amounts at first and second corresponding points, which are defined on the each of the created molding surfaces and correspond respectively to the first and second reference points, with respect to design values by the design data; a dividing step of dividing an error amount at each of the first and second corresponding points on each of the molding surfaces of the pair of mold dies into a vertical component and a lateral component; a first correction surface defining step of defining a first correction surface corresponding to one of the molding surfaces based on a first added error amount obtained by adding together an error amount in the vertical direction at the first corresponding point on the one of the molding surfaces and an error amount in the vertical direction at the first corresponding point on the other of the molding surfaces; a second correction surface defining step of defining a second correction surface corresponding to the one of the molding surfaces based on a second added error amount obtained by adding together an error amount in the vertical direction at the second corresponding point on the one of the molding surfaces and an error amount in the vertical direction at the second corresponding point on the other of the molding surfaces; a third correction surface defining step of defining a third correction surface corresponding to the other of the molding surfaces based on a third added error amount obtained by adding together an error amount in the lateral direction at the first corresponding point on the one of the molding surfaces and an error amount in the lateral direction at the first corresponding point on the other of the molding surfaces; a fourth correction surface defining step of defining a fourth correction surface corresponding to the other of the molding surfaces based on a fourth added error amount obtained by adding together an error amount in the lateral direction at the second corresponding point on the one of the molding surfaces and an error amount in the lateral direction at the second corresponding point on the other of the molding surfaces; a first design data correction step of combining a design surface by the design data of the one of the molding surfaces, the first correction surface and the second correction surface, and corrects the design data of the one of the molding surfaces based on combined data after the combining; a second design data correction step of combining a design surface by the design data of the other of the molding surfaces, the third correction surface and the fourth correction surface, and corrects the design data of the other of the molding surfaces based on combined data after the combining; and a corrected surface creation step of creating each of the molding surfaces of the pair of mold dies in accordance with the corrected design data of each of the molding surfaces.

According to the above described configuration, since no alteration by the trial and error is made to the design data, information not relating to intended design, such as an accidental manufacturing error, is not mixed to the design data. That is, each of the molding surfaces of the pair of mold dies has a shape for which a correction for the error amount is made based on the design data by the intended design (i.e., design data mathematically expressing the shape of the molding surface), and therefore it can be said that the molding surface has the shape suitable for manufacturing of an eyeglass lens according to the intended design. Since no alteration by the trial and error is made to the design data, the design data can be used as an appropriate parameter for evaluating the molding surface shape.

According to the above described configuration, a correction amount for correcting the error amount with respect to the design value is defined, for each of the evaluation points (corresponding points), as an independent correction surface based on the error amount at each evaluation point, for each of the molding surfaces of for the object side surface molding and the eye side surface molding. Since each correction surface is defined as a mathematically-defined surface, breaking of the optical property does not occur in the correction shape of the molding surface obtained by combining the correction surfaces. In contrast to the conventional design method in which correction is made to simultaneously satisfy desired prescriptions at a plurality of evaluation points, each correction surface is defined to focus on a correction at a single evaluation point. Therefore, each correction surface can be simply defined without causing breaking of the optical property. More specifically, the error amount at each evaluation point (corresponding point) is divided into a vertical direction component and a lateral direction component. The correction surface for one of the molding surfaces is defined independently based on the error amount in the vertical direction, for each of the evaluation points. The correction surface for the other of the molding surfaces is defined independently based on the error amount in the lateral direction, for each of the evaluation point. Since an optimal correction surface can be defined for each direction component and can be added to each molding surface, the precision for shape correction can be enhanced, and the number of times of trial and error can be decreased.

The one of the molding surfaces may correspond to an object side surface of the progressive power lens of a double side combination type, and the other of the molding surfaces may correspond to an eye side surface of the progressive power lens of a double side combination type.

In the second correction surface defining step, the second correction surface may be defined such that the second correction surface has no power at the first corresponding point and is defined based on the first correction surface and the second added error amount. In the fourth correction surface defining step, the fourth correction surface may be defined such that the fourth correction surface has no power at the first corresponding point and is defined based on the third correction surface and the fourth added error amount.

In the second correction surface defining step, the second correction surface may be defined such that power in the vertical direction at the second corresponding point is set as a value obtained by subtracting the first added error amount from the second added error amount, and that the entire second correction surface is offset to have substantially no power at the first corresponding point. In the fourth correction surface defining step, the fourth correction surface may be defined such that power in the lateral direction at the second corresponding point is set as a value obtained by subtracting the third added error amount from the fourth added error amount, and that the entire fourth correction surface is offset to have substantially no power at the first corresponding point.

In the first design data correction step, curvature distributions of the design surface by the design data of the one of the molding surfaces, the first correction surface and the second correction surface may be obtained and combined, and the corrected design data of the one of the molding surfaces may be created as height data at each position on the one of the molding surfaces with respect to a predetermined reference position based on the combined curvature distribution. In the second design data correction step, curvature distributions of the design surface by the design data of the other of the molding surfaces, the third correction surface and the fourth correction surface may be obtained and combined, and the corrected design data of the other of the molding surfaces may be created as height data at each position on the other of the molding surfaces with respect to a predetermined reference position based on the combined curvature distribution, According to another aspect of the invention, there is provided a manufacturing method for a mold, comprising: an arranging step of arranging a glass material on each of the molding surfaces of the pair of mold dies manufactured according to one of the above described manufacturing methods; and a manufacturing step of softening the glass material arranged on each of the molding surfaces by heat, forming an upper surface of the glass material by letting a lower surface of the glass material closely contact the each of the molding surfaces, manufacturing, using one of the pair of mold dies, a mold having a transferring surface for forming an object side surface of a progressive power lens of a double side combination type, and manufacturing, using the other of the pair of mold dies, a mold having a transferring surface for forming an eye side surface of the progressive power lens of a double side combination type.

According to another aspect of the invention, there is provided a manufacturing method for an eyeglass lens, comprising: a defining step of arranging a pair of molds, which is manufactured according to one of the above described manufacturing methods, to face with each other, and defining a cavity by sealing a gap between the pair of molds with a sealing member; an injection step of injecting a lens material liquid into the cavity; a hardening reaction step of causing the lens material liquid injected into the cavity to induce a hardening reaction, and obtaining an eyeglass lens base to which each of transferring surface shapes of the pair of molds is transferred; and a mold release step of releasing the eyeglass lens base, to which each of the transferring surface shapes is transferred, from the pair of molds.

BRIEF DESCRIPTION OF THE
ACCOMPANYING DRAWINGS

DETAILED DESCRIPTION OF THE
EMBODIMENTS

Hereinafter, a manufacturing method for a glass mold die, a manufacturing method for a glass mold for en eyeglass lens, and a manufacturing method and a manufacturing system for an eyeglass lens by the glass mold according to an embodiment of the invention are described with reference to the accompanying drawings.

Eyeglass Lens Manufacturing System 1

Figure 1:
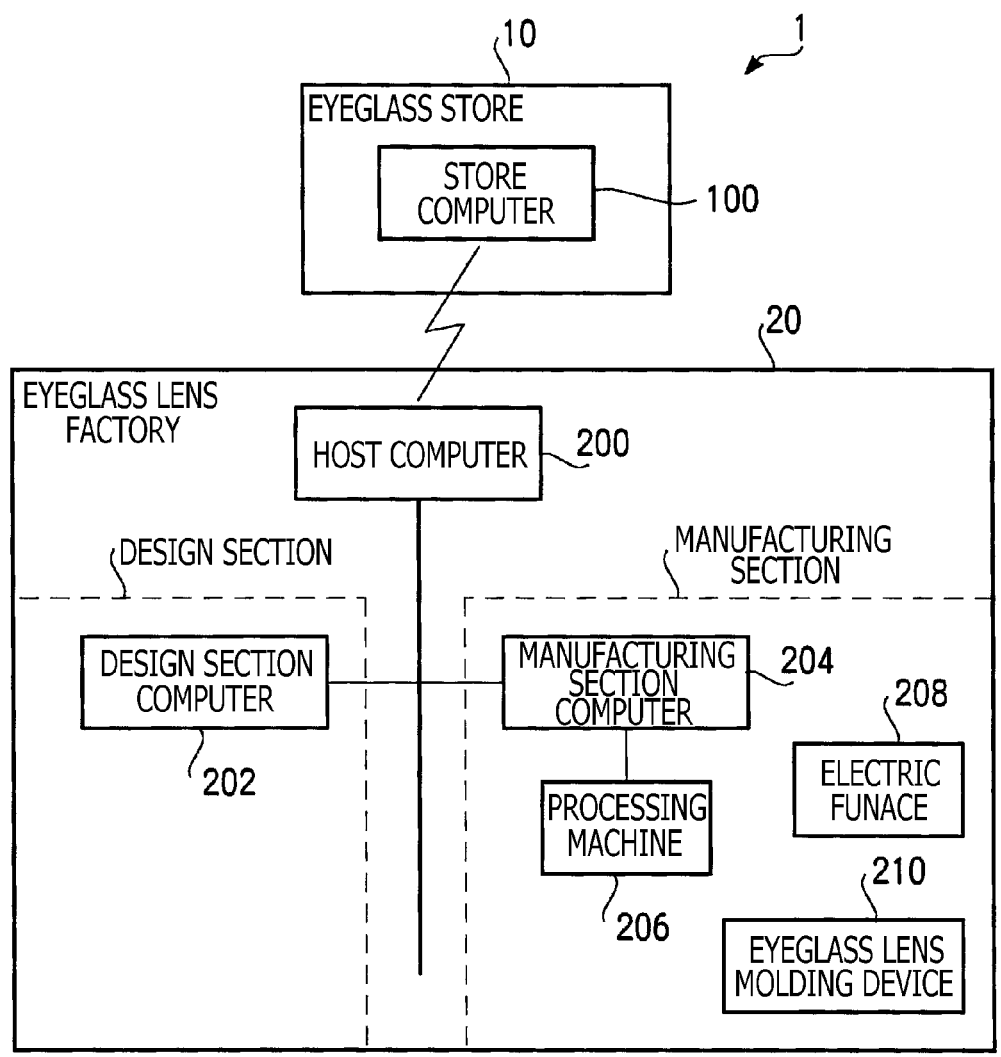
FIG. 1 is a block diagram illustrating a configuration of a manufacturing system for manufacturing a glass mold die, a glass mold for an eyeglass lens, and an eyeglass lens according to an embodiment of the invention.

FIG. 1 is a block diagram illustrating a configuration of a manufacturing system 1 for manufacturing a glass mold die, a glass mold for an eyeglass lens, and an eyeglass lens according to an embodiment of the invention. As shown in FIG. 1, the eyeglass lens manufacturing system 1 includes an eyeglass store 10 which places an order for an eyeglass lens according to a prescription for a customer (a wearer), and an eyeglass lens factory 20 which receives the order from the eyeglass store 10 and manufactures an eyeglass lens. Issuance of an order to the eyeglass lens factory 20 is made through data transmission through, for example, a network (e.g., the Internet) or facsimile. The orderer may include an ophthalmologist and a consumer.

Eyeglass Store 10

In the eyeglass store 10, a store computer 100 is installed. The store computer 100 is, for example, a PC (Personal Computer) and software for placing an order for an eyeglass lens to the eyeglass lens factory 20 has been installed in the PC. To the store computer 100, lens data and frame data are inputted by a store staff through use of a mouse or a keyboard. The lens data includes, for example, prescriptions (a base curve, a spherical surface power, an astigmatic power, an astigmatic axis direction, a prismatic power, a prism base direction, an addition, PD (Pupillary Distance) for a distance portion and PD for a near portion), a wearing condition of an eyeglass (a vertex distance, a forward-tilting angle, a frame tilt angle), the type of an eyeglass lens (a single-vision spherical surface, a single-vision aspherical surface, multifocal (bifocal, progressive power)), coating (e.g., dyeing processing, hard coating, anti-reflection coating, ultraviolet cutting) and layout data according to a customer's request. The frame data includes shape data of a frame selected by a customer. The frame data is managed, for example, by using a barcode tag, and can be obtained, for example, by reading a barcode tag adhered to a frame with a barcode reader. The store computer 100 transmits ordering data (the lens data and the frame data) to the eyeglass lens factory 20 via, for example, the Internet.

Eyeglass Lens Factory 20

In the eyeglass lens factory 20, a LAN (Local Area Network) based on a host computer 200 is implemented, and a plurality of terminal devices for various sections including a design section computer 202 and a manufacturing section computer 204 are connected to the host computer 200. The design section computer 202 and the manufacturing section computer 204 are, for example, PCs. In the design section computer 202, a program for designing a glass mold die has been installed. In the manufacturing section computer 204, a program for executing shape correction and processing for a glass mold die by trial and error has been installed. To the host computer 200, the ordering data transmitted from the store computer 100 via the Internet is inputted. The host computer 200 transfers the ordering data to the design section computer 202.

As an eyeglass lens manufactured according to the embodiment, a progressive power lens having a progressive power component (i.e., an area where a refractive power continuously changes between two reference points), such as a near-near progressive power lens, an intermediate-near progressive power lens and a distance-near progressive power lens of a one side aspherical type having a progressive power component on a convex surface (an object side surface) or a concave surface (an eye side surface) thereof, a both side progressive type having a progressive power component divided into a convex surface and a concave surface or a double side combination type in which a vertical progressive power component is assigned to a convex surface and a horizontal progressive power component is assigned to a concave surface, a lens in which progressive power components in different directions are assigned to respective surfaces thereof, and a lens of a type similar to the progressive power lens are considered. Under JIS (Japanese Industrial Standard) T7315 (ISO 8980-2: 2004), it is defined that a hidden mark should be marked on a progressive power lens. The hidden mark includes, for example, a pair of alignment marks defining a horizontal reference of a lens. A distance portion measurement reference point or a near portion measurement reference point is identified based on a pair of alignment marks. The same alignment marks are marked on an eyeglass lens manufactured according to the embodiment. In this embodiment, "lateral direction" means a direction (horizontal direction) parallel with the horizontal reference defined by a pair of alignment marks, and "vertical direction" means a direction perpendicular the lateral direction (horizontal direction).

Design and Manufacture of Glass Mold Die

Hereafter, design and manufacture of a glass mold die are explained. In this embodiment, the design section computer 202 is used to design a glass mold die based on the ordering data. The design data of the glass mold die defines a function (e.g., a function expressing a surface power distribution) for forming a glass mold for an eyeglass lens required for obtaining a transmission power property suitable for a prescription of a wearer by a convex surface and a concave surface of the eyeglass lens. The design data is converted to have a format which the manufacturing section computer 204 is able to interpret, and is transferred to the manufacturing section computer 204.

The manufacturing section computer 204 controls a processing machine 206 in accordance with the transferred design data to process the glass mold die. A molding surface of the processed glass mold die is measured to obtain an error amount with respect to the design value at each evaluation point by a measuring device (not shown). The manufacturing section computer 204 corrects the design data of the glass mold die so that the error amount at each evaluation point converges within a tolerance. In the manufacturing section, the trial and error (correction to the design data by the manufacturing section computer 204 and processing of the glass mold die by the processing machine 206) is repeated until the error amount at each evaluation point converges within the tolerance by using the manufacturing section computer 204 and the processing machine 206.

As described above, in this embodiment, no alteration is made to the design data provided by the design section. Therefore, information not relating to intended design, such as, an accidental manufacturing error, is not mixed to the design data. That is, the molding surface of the glass mold die has a shape which has been corrected by an error amount with respect to a design surface defined by the intended design data (the design data mathematically expressing the shape of the molding surface) based on the prescription, and therefore it can be said that the shape of the molding surface is suitable for manufacturing of the eyeglass lens according to the intended design. Furthermore, since no alteration by the trial and error is made to the design data, the design data can be used as an appropriate parameter for evaluating the molding surface shape.

Furthermore, in contrast to the conventional method where the measured data obtained by the manufacturing section is fed back to the design section to redesign the mold die, the design data to be provided from the design section to the manufacturing section is a fixed value, and is not altered based on the measured data. According to the embodiment, by managing separately "design" and "correction" ("design" is assigned to the design section, and "correction" is assigned to the manufacturing section), there is no need for repeatedly executing the trial and error over the design section and the manufacturing section, which is advantageous in regard to shortening of the lead time.

Manufacturing of Glass Mold for Eyeglass Lens using Glass Mold Die

Figure 2A:
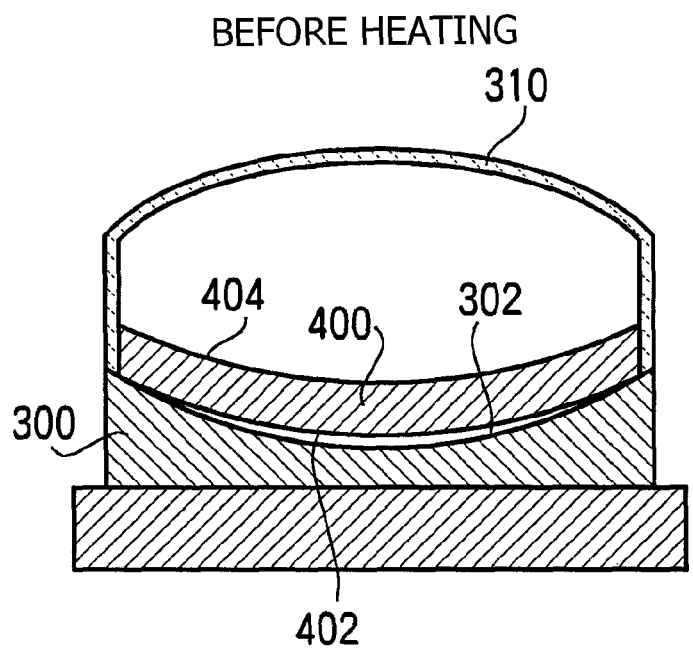
FIGS. 2A and 2B are explanatory illustrations for explaining a manufacturing method for manufacturing a glass mold for an eyeglass lens according to the embodiment.
Figure 2B:
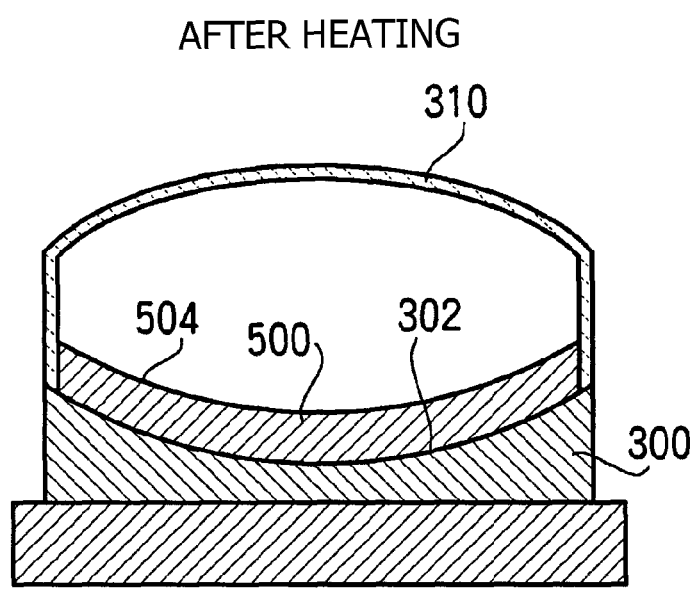
Figure 3:
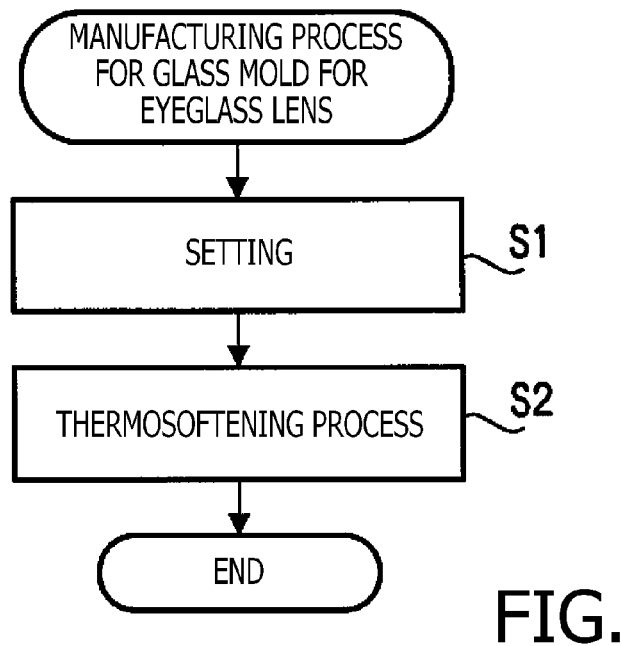
FIG. 3 is a flowchart illustrating a manufacturing process for the glass mold for an eyeglass lens according to the embodiment.

FIGS. 2A and 2B are explanatory illustrations for explaining a manufacturing method for manufacturing a glass mold 500 for an eyeglass lens using a glass mold die 300. FIG. 3 is a flowchart illustrating a manufacturing process for the glass mold 500 for an eyeglass lens. In this embodiment, the glass mold 500 for an eyeglass lens is formed by the thermally drooping molding method using the glass mold die 300. Details about the manufacturing method for the glass mold for an eyeglass lens by the thermally drooping molding method using the glass mode die of this type is described, for example, in WO 2007/58353 by the assignee of the present application. In the following, for convenience of explanation, a step is abbreviated as "S".

S1 of FIG. 3 (Setting)

As shown in FIG. 2A, the glass material (preform) 400 which is a workpiece is placed, for example, on a molding surface 302 of the glass mold die 300 in a clean room in a state where the central portion of a lower surface 402 of the glass material 400 is away from the glass mold die 300. Next, a covering member 310 for separating at least the entire glass material 400 and the molding surface 302 from the outside is put on the glass mold die 300.

S2 of FIG. 3 (Thermosoftening)

The glass material 400 placed on the molding surface 203 is subjected to a thermosoftening process in an electric furnace 208 for which temperature control is performed based on a predetermined temperature program. As shown in FIG. 2B, the lower surface 402 of the glass material 400 softened by heat deforms by its own weight and closely contacts the molding surface 302, and then the shape of the molding surface 302 is transferred to an upper surface 404 (a reference number 504 is assigned to the upper surface after the transferring). As a result, a glass mold 500 for an eyeglass lens formed such that the upper surface 504 has a desired shape is obtained. In the examples shown in FIGS. 2A and 2B, a glass mold for forming a convex surface (an object side surface) of an eyeglass lens is formed. A glass mold for forming a concave surface (an eye side surface) is also formed in the same manner. In this specification, explanations for the glass mold die 300 and the glass mold 500 for forming an eye side surface are omitted for avoiding duplicate explanations.

Manufacturing of Eyeglass Lens using Glass Mold for Eyeglass Lens

Figure 4:
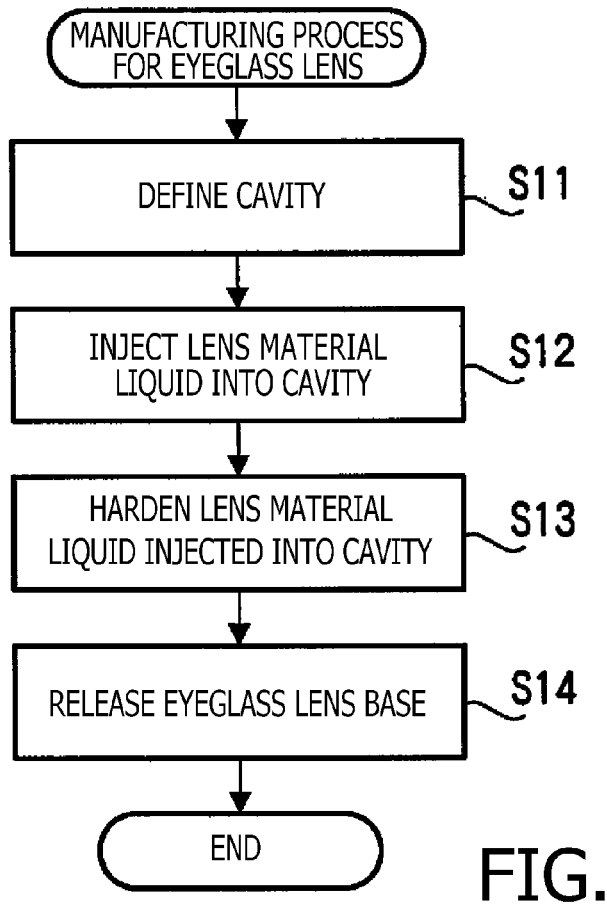
FIG. 4 is a flowchart illustrating a process for manufacturing an eyeglass lens according to the embodiment.

FIG. 4 is a flowchart illustrating a process for manufacturing an eyeglass lens using the glass mold 500 formed by the above described thermally drooping molding method. Since the method of this type is well known, explanation thereof is explained generally.

S11 of FIG. 4 (Defining of Cavity)

To define a cavity into which lens material is injected, a pair of glass molds 500 for an eyeglass lens (a glass mold for forming a convex surface (an object side surface) of an eyeglass lens and a glass mold for forming a concave surface (an eye side surface) of an eyeglass lens) is placed to face with each other to have an interval corresponding to the thickness of the eyeglass lens, and an adhesive tape is wound around the peripheral surface of the both glass molds. By winding the adhesive tape and sealing the space between the both molds, a cavity is defined and a mold is completed. It should be noted that the cavity is a closed space defined by transferring surfaces of a pair of glass molds corresponding to convex and concave surfaces of an eyeglass lens and the adhesive tape wound around to have the shape corresponding to the peripheral of the eyeglass lens. The arrangement of the pair of glass molds and winding of the adhesive tape are performed using, for example, a jig.

In the eyeglass lens factory 20, a plurality of glass molds each having a transferring surface adapted for a power range of each group defined by dividing the whole production range into a plurality of groups have been prepared in advance. For a glass mold for a concave side, a glass mold suitable for the prescription contained in the accepted ordering data (lens data) is selected from the glass mold groups by the design section computer 202. It should be noted that a glass mold may be newly designed and manufactured for both of a convex side and a concave side based on the accepted ordering data.

S12 of FIG. 4 (Injection of Lens Material Liquid into Cavity)

When the completed mold is set on an eyeglass lens molding device 210, a hole is formed in a part of the adhesive tape, and the lens material liquid is injected into the cavity through the hole.

S13 of FIG. 4 (Hardening of Lens Material Liquid Injected into Cavity)

The lens material liquid injected and filled in the cavity is polymerized and hardened, for example, through radiation of heat or ultraviolet light. As a result, a polymer (eyeglass lens base material) to which each transfer surface shape of the pair of glass molds and the peripheral surface shape of the adhesive tape are transferred is obtained.

S14 of FIG. 4 (Release of Eyeglass Lens Base Material)

The eyeglass lens base material obtained by polymerization and hardening is released from the mold. To enhance the releasing property of the eyeglass lens base material from the mold, a mold-releasing agent may be applied to each transferring surface of the pair of glass molds. To the released eyeglass lens base material, removal of residual stress by an annealing process or various coatings, such as a hard coat processing, an antireflection film, ultraviolet cutting may be applied. Consequently, the eyeglass lens is completed and is delivered to the eyeglass store 10.

Specific Manufacturing Method for Glass Mold Die

EXAMPLE 1

Figure 5:
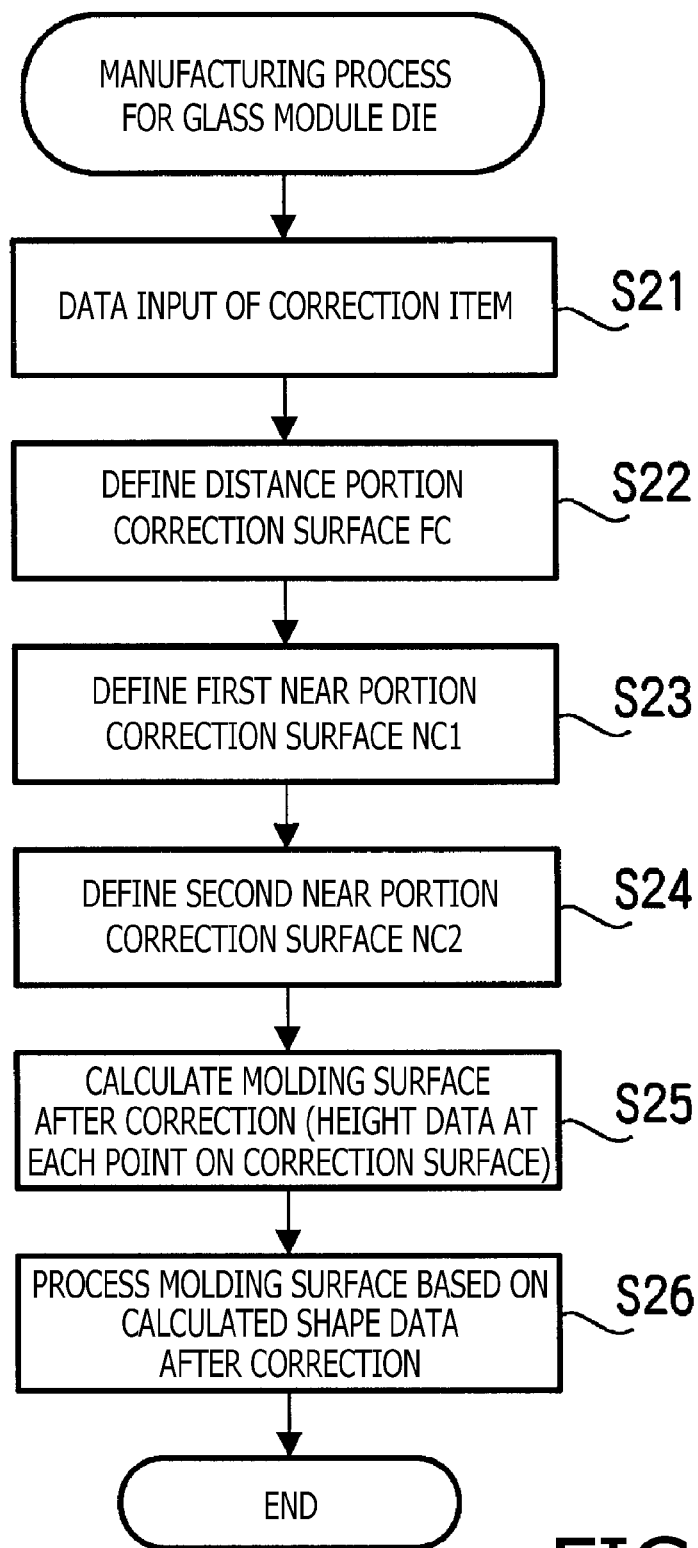
FIG. 5 is a flowchart illustrating a manufacturing process for a glass mold die according to example 1.

Next, a specific manufacturing method for the glass mold die 300 executed in the manufacturing section is explained. FIG. 5 is a flowchart illustrating the manufacturing process for the glass mold die 300 executed in the manufacturing section according to example 1. In the example shown in FIG. 5, the glass mold die 300 is a glass mold die required for forming a distance-near progressive power lens of a one side aspherical surface type. Regarding the distance-near progressive power lens, evaluation points (a distance power measurement point F and a near power measurement point N) are defined in respective refractive parts of the distance portion and the near portion, and the distance-near progressive power lens is required to have a power satisfying the prescription at each evaluation point.

In the following, explanations are given as to a process where the processed molding surface 302 is measured directly and the molding surface 302 after correction is directly calculated based on the measurement result. However, based on an idea that the thickness of the glass mold 500 for an eyeglass lens is approximately uniform, the upper surface 504 of the glass mold 500 obtained by the molding may be measured and the corrected shape of the upper surface 504 may be calculated based on the measurement result, and finally the correction shape of the molding surface 302 may be obtained by offsetting the thickness of the glass mold 500. The latter method is described, for example, in International Publication No. WO2007/58353 by the assignee of the present application.

S21 of FIG. 5 (Data Input of Correction Item)

As described above, in the manufacturing section, the manufacturing section computer 204 controls the processing machine 206 in accordance with the design data transferred from the design section computer 202, and executes preliminary processing of the glass mod die 300. Next, based on the measurement result of the molding surface 302 by the measurement device, the error amounts at corresponding points F', N', on the molding surface 302, of the evaluation points of the distance power measurement point F and the near power measurement point N with respect to the design values are specified. Specifically, the error amount is specified for each of correction items of surface refractive powers DVf, DHf, DVn and DHn. The error amount specified for each correction item is inputted to the manufacturing section computer 204. The surface refractive powers DVf, DHf are respectively surface refractive powers defined, at the distance power measurement point F, for a vertical cross sectional curve and a lateral cross sectional curve passing through the distance power measurement point F. The surface refractive powers DVn, DHn are respectively surface refractive powers defined, at the near power measurement point N, for a vertical cross sectional curve and a lateral cross sectional curve passing through the near power measurement point N. That is, in the example shown in FIG. 5, the error amount at each of the corresponding points F', N' is defined by dividing the error amount into the vertical direction item and the lateral direction item.

S22 of FIG. 5 (Definition of Distance Portion Correction Surface)

The manufacturing section computer 204 defines a distance portion correction surface FC to be over laid over the entire design surface of the molding surface 302 designed in accordance with the design data. Specifically, the distance portion correction surface FC is defined as a surface (an astigmatic surface including a spherical surface) having a surface power distribution for correcting the error amount (the surface refractive power DVf) in the vertical direction and the error amount (the surface refractive power DHf) in the lateral direction at the corresponding point F' of the distance power measurement point F. For example, when the error amount (the surface refractive power DVf) and the error amount (the surface refractive power DHf) are 1.0 D and 2.0 D, respectively, the distance portion correction surface FC is defined as a toric surface having the refractive power of −1.0 D in the vertical direction and −2.0 D in the lateral direction.

S23 of FIG. 5 (Definition of First Near Portion Correction Surface NC1)

The manufacturing section computer 204 defines a first near portion correction surface NC1 to be over laid over the entire design surface of the molding surface 302. Specifically, the first near portion correction surface NC1 is a surface having a surface power distribution (a vertical surface progressive power distribution) for correcting the error amount in the vertical direction at the corresponding point N' of the near portion measurement point N, and is set by considering an inset amount corresponding to convergence of eyes.

When the first near portion correction surface NC1 is defined, it is necessary to consider the relationship with the distance portion correction surface FC. For example, since the distance portion correction surface FC is over laid over the entire surface including the corresponding point N', the surface refractive power DVn' in the vertical direction at the corresponding point N' on the first near portion correction surface NC1 is set as a value obtained by subtracting the surface refractive power in the vertical direction at the corresponding point N' on the distance portion correction surface FC from the error amount (the surface refractive power DVn).

In order to assign correction of the error amount at the corresponding point F' of the distance power measurement point F to only the distance portion correction surface FC, the first near portion correction surface NC1 is set as a surface not having a surface refractive power at the corresponding point F'. Specifically, when the first near portion correction surface NC1 set by considering the inset amount and the surface refractive power at the corresponding point N' on the distance portion correction surface FC has a surface refractive power at the corresponding pint F', the surface refractive power is offset uniformly over the entire first near portion correction surface NC1 so that the surface refractive power becomes almost 0 at the corresponding point F'.

During the process for defining the first near portion correction surface NC1, the manufacturing section computer 204 calculates the addition ADDV of the vertical direction component of the first near portion correction surface NC1, and multiplies the entire first near portion correction surface NC1 by the coefficient (DVn'/ADDV). As a result, the first near portion correction surface NC1 is set as a surface having the surface refractive power DVn' in the vertical direction at the corresponding point N' of the near power measurement point N.

S24 of FIG. 5 (Definition of Second Near Portion Correction Surface NC2)

The manufacturing section computer 204 defines a second near portion correction surface NC2 to be over laid over the entire design surface of the molding surface 302. The second near portion correction surface NC2 is a surface having a surface power distribution (a lateral surface progressive power distribution) for correcting an error amount in the lateral direction (a surface refractive power DHn) at the corresponding point N' of the near portion measurement point N, and is set by considering the inset amount according to the convergence of eyes.

When the second near portion correction surface NC2 is defined, it is required to consider the relationship with the distance portion correction surface FC. For example, since the distance portion correction surface FC is over laid over the entire surface including the corresponding point N', the surface refractive power DHn' in the horizontal direction at the corresponding point N' on the second near portion correction surface NC2 is set as a value obtained by subtracting the surface refractive power in the lateral direction at the corresponding point N' on the distance portion correction surface FC from the error amount (the surface refractive power DHn).

In order to assign correction of the error amount at the corresponding point F' of the distance power measurement point F to only the distance portion correction surface FC, the second near portion correction surface NC2 is set as a surface not having a surface refractive power at the corresponding point F'. Specifically, when the second near portion correction surface NC2 set by considering the inset amount and the surface refractive power at the corresponding point N' on the distance portion correction surface FC has a surface refractive power at the corresponding pint F', the surface refractive power is offset uniformly over the entire second near portion correction surface NC2 so that the surface refractive power becomes almost 0 at the corresponding point F'.

During the process for defining the second near portion correction surface NC2, the manufacturing section computer 204 calculates the addition ADDH of the lateral direction component of the second near portion correction surface NC2, and multiplies the entire second near portion correction surface NC2 by the coefficient (DHn'/ADDH). As a result, the second near portion correction surface NC2 is set as a surface having the surface refractive power DHn' in the lateral direction at the corresponding point N' of the near power measurement point N.

S25 of FIG. 5 (Calculation of Molding Surface after Correction (Height Data at Each Point in Correction Surface))

The manufacturing section computer 204 calculates and combines the curvature distribution in a predetermined cross sectional plane direction of each of a design surface of the design data, the distance portion correction surface FC, the first near portion correction surface NC1 and the second near portion correction surface NC2, and smoothes the combined curvature distribution, for example, using a one-dimensional B-spline function. The manufacturing section computer 204 integrates the smoothed curvature distribution to calculate the inclination distribution in the predetermined cross sectional plane direction. The inclination at the geometrical center (the geometrical center of the eyeglass lens) of the molding surface 302 is set as 0. The manufacturing section computer 204 executes the numerical integration for the calculated inclination distribution through Gauss-Legendre algorithm. As a result, the height distribution of the corrected molding surface 302 with respect to the height in the Z-direction at the geometrical center of the molding surface 302 (height 0) is obtained. By executing the above described sequence of calculation for the predetermined cross sectional plane and executing interpolation for space between height distributions in each cross sectional plane, the manufacturing section computer 204 obtains the height data in the Z-direction at each XY point on the molding surface 302, i.e., the shape data of the molding surface after correction.

S26 of FIG. 5 (Processing for Molding Surface Based on Calculated Shape Data after Correction)

The manufacturing section computer 204 executes formal data processing, such as, addition of a shape required for processing to the periphery of the corrected molding surface 302, and thereafter controls the processing machine 206 in accordance with the completed data to make again the glass mold die 300. Thus, in the manufacturing section, the trial and error is repeated until the error amount at each evaluation point converges within the tolerance using the manufacturing section computer 204 and the processing machine 206.

According to the example 1, the correction amount for correcting the error amount with respect to the design value is defined, for each of the evaluation points (corresponding points) of the molding surface 302, as an independent correction surface based on the error amount at each evaluation point. Since each correction surface is defined as a mathematically-defined surface, breaking of the optical property does not occur in the correction shape of the molding surface 302 obtained by combining the correction surfaces. In contrast to the conventional design method in which correction is made to simultaneously satisfy desired prescriptions at a plurality of evaluation points, each correction surface is designed to make a correction at a single evaluation point. Therefore, each correction surface can be simply defined without causing breaking of the optical property.

More specifically, in the example 1, the error amount at each evaluation pint (each corresponding point) is divided into components in a plurality of directions (the vertical component and the horizontal component in this embodiment), and the correction amount at each evaluation point is defined, for each of the directions, as an independent correction surface based on the error amount in each direction. Since an optimal correction surface can be defined at each evaluation point in each of the direction, the precision of shape correction can be enhanced, and the number of times of trial and error can be decreased.

EXAMPLE 2

Figure 6:
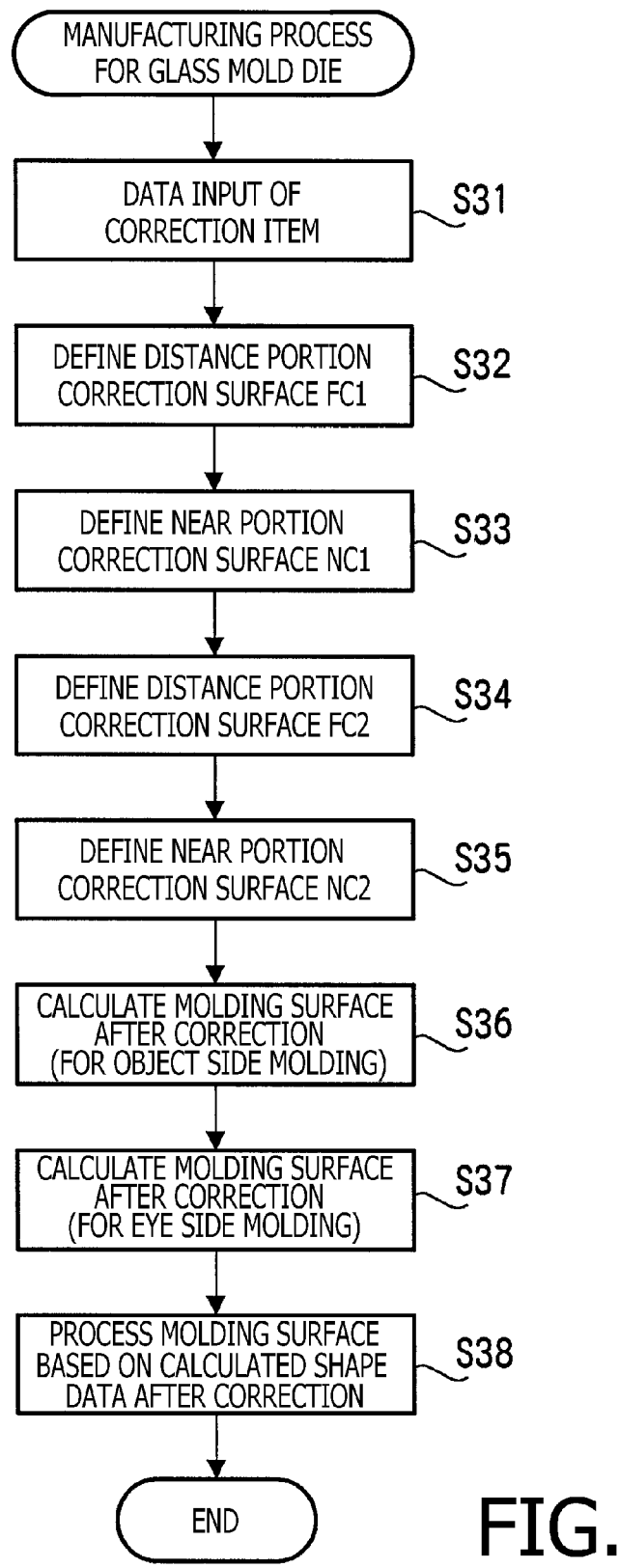
FIG. 6 is a flowchart illustrating a manufacturing process for a glass mold die according to example 2.

FIG. 6 is a flowchart illustrating a manufacturing process executed in the manufacturing section for the pair of glass mold dies 300 for object side molding and eye side molding according to a second example. In the example shown in FIG. 6, the pair of glass mold dies 300 is used to form a progressive power lens of a double side combination type. Regarding the progressive power lens of a double side combination type, an evaluation point is defined for each of a distance portion and a near portion arranged on each of a convex surface and a concave surface (a distance power measurement point F1 and a near power measurement point N1 for the convex surface, and a distance power measurement point F2 and a near portion measurement point N2 for the concave surface), and it is required to have a power satisfying a prescription at each evaluation point. Details of the progressive power lens of a double side combination type can be seen, for example, in Japanese Patent Publication No. 4219148 by the assignee of this application. In the second example, to elements which are substantially the same as those of the example 1, the same reference numbers are assigned, and explanations thereof will not be repeated.

S31 of FIG. 6 (Input of Correction Item)

As described above, in the manufacturing section, the manufacturing section computer 204 controls the processing machine 206 in accordance with the design data transferred from the design section computer 202, and performs preliminary processing for the pair of glass mold dies for the object side molding and the eyeball side molding. Then, based on the measurement result of the molding surface 302 by the measurement device, the error amounts with respect to the design values at the points F1', N1' on the molding surface 302 (for object side molding) corresponding to the distance power measurement point F1 and the near power measurement point N1, the error amounts with respect to the design values at the points F2', N2' on the molding surface 302 (for eye side molding) corresponding to the distance power measurement point F2 and the near power measurement point N2 are obtained. Specifically, the error amount is identified for each of correction items of DVf1, DHf1, DVn1, DHn1, DVf2, DHf2, DVn2 and DHn2. The error amount of each identified correction item is inputted to the manufacturing section computer 204. The surface powers DVf1, DHf1 are respectively defined as surface powers, at the distance power measurement point F1, of the vertical cross sectional curve and the lateral cross sectional curve passing through the distance power measurement point F1 on the convex surface of the progressive power lens of a double side combination type. The surface powers DVn1, DHn1 are respectively defined as surface powers, at the near power measurement point N1, of the vertical cross sectional curve and the lateral cross sectional curve passing through the near power measurement point N1 on the convex surface of the progressive power lens of a double side combination type. The surface powers DVf2, DHf2 are respectively defined as surface powers, at the distance power measurement point F2, of the vertical cross sectional curve and the lateral cross sectional curve passing through the distance power measurement point F2 on the concave surface of the progressive power lens of a double side combination type. The surface powers DVn2, DHn2 are respectively defined as surface powers, at the near power measurement point N2, of the vertical cross sectional curve and the lateral cross sectional curve passing through the near power measurement point N2 on the convex surface of the progressive power lens of a double side combination type. That is, in the example shown in FIG. 6, each of error amounts at the corresponding points F1', N1', F2', N2' is defined by dividing into the vertical direction item and the horizontal direction item.

S32 of FIG. 6 (Definition of Distance Portion Correction Surface FC1 (First Correction Surface))

The manufacturing section computer 204 defines the distance portion correction surface FC1 to be over laid on the entire design surface of the molding surface 302 (for molding of an object side surface) designed in accordance with the design data. Specifically, the distance portion correction surface FC1 is defined as a surface (e.g., a cylindrical surface) having a surface power distribution (a vertical surface progressive power distribution) for correcting an error amount E1 (a sum of the surface powers DVf1 and DVf2) obtained by adding together the error amount in the vertical direction at the corresponding point F1' on the molding surface 302 (for molding of an object side surface) and the error amount in the vertical direction at the corresponding point F2' on the molding surface 302 (for molding of an eye side surface).

S33 of FIG. 6 (Definition of Near Portion Correction Surface NC1 (Second Correction Surface))

The manufacturing section computer 204 defines the near portion correction surface NC1 to be over laid on the entire design surface of the molding surface 302 (for molding of an object side surface). Specifically, the near portion correction surface NC1 is a surface having a surface power distribution for correcting an error amount E2 (a sum of the surface powers DVn1 and DVn2) obtained by adding together the error amount in the vertical direction at the corresponding point N1' on the molding surface 302 (for molding of an object side surface) and the error amount in the vertical direction at the corresponding point N2' on the molding surface 302 (for molding of an eye side surface), and is set by considering the inset amount according to the convergence of eyes.

When the near portion correction surface NC1 is defined, it is necessary to consider the relationship with the distance portion correction surface FC1. For example, since the distance portion correction surface FC1 is over laid over the entire surface including the corresponding point N1', the surface power DVn1' in the vertical direction at the corresponding point N1' on the near portion correction surface NC1 is set as a value obtained by subtracting the surface power E1 in the vertical direction at the corresponding point N1' on the distance portion correction surface FC1 from the error amount E2.

In order to assign the correction amount to be added to the corresponding point F1' on the molding surface (for molding of an object side surface) to only the distance portion correction surface FC1, the near portion correction surface NC1 is set as a surface not having a surface power at the corresponding point F1'. Specifically, when the near portion correction surface NC1 set by considering the inset amount and the surface power E1 in the vertical direction at the corresponding point N1' on the distance portion correction surface FC1 has a surface power at the corresponding point F1', the surface power is offset uniformly over the entire near portion correction surface NC1 so that the surface power becomes substantially zero at the corresponding point F1'.

During the process for defining the near portion correction surface NC1, the manufacturing section computer 204 calculates the addition ADDV in the vertical component of the near portion correction surface NC1, and multiplies the entire near portion correction surface NC1 by a factor (DVn1'/ADDV). As a result, the near portion correction surface NC1 is set as a surface having the surface power DVn1' in the vertical direction at the corresponding point N1' of the near power measurement point N1.

S34 of FIG. 6 (Definition of Distance Portion Correction Surface FC1 (Third Correction Surface))

The manufacturing section computer 204 defines a distance portion correction surface FC2 to be over laid on the entire design surface of the molding surface 302 (for molding of an eye side surface) designed according to the design data. Specifically, the distance portion correction surface FC2 is designed as a surface (e.g., a cylindrical surface) having a surface power distribution (a lateral surface progressive power distribution) for correcting a error amount E3 (a sum of surface powers DHf1 and DHf2) obtained by adding together an error amount in the lateral direction at the corresponding point F1' on the molding surface 302 (for molding of an object side surface) and an error amount in the lateral direction at the corresponding point F2' on the molding surface 302 (for molding of a eye side surface).

S25 of FIG. 6 (Definition of Near Portion Correction Surface NC2 (Fourth Correction Surface))

The manufacturing section computer 204 defines the near portion correction surface NC2 to be over laid on the entire design surface of the molding surface 302 (molding for an eye side surface). Specifically, the near portion correction surface NC2 is a surface having a surface power distribution (a lateral surface progressive power distribution) for correcting an error amount E4 (a sum of surface power DHn1 and DHn2) obtained by adding together an error amount in the lateral direction at the corresponding point N1' on the molding surface 302 (for molding of an object side surface) and an error amount in the lateral direction at the corresponding point N2' on the molding surface 302 (for molding of an eye side surface), and is set by considering the inset amount corresponding to convergence of eyes.

When the near portion correction surface NC2 is defined, it is necessary to consider the relationship with the distance portion correction surface FC2. For example, since the distance portion correction surface FC2 is over laid on the entire surface including the corresponding point N2', the surface power DHn2' in the lateral direction at the corresponding point N2' on the near portion correction surface NC2 is set as a value obtained by subtracting the surface power E3 in the lateral direction at the corresponding point N2' on the distance portion correction surface FC2 from the error amount E4.

Since the correction amount to be added to the corresponding point F2' on the molding surface 302 (for molding of an eye side surface) is assigned only to the distance portion correction surface FC2, the near portion correction surface NC2 is set as a surface not having a surface power at the corresponding point F2'. Specifically, when the near portion correction surface NC2 set by considering the inset amount and the surface power E3 in the lateral direction at the corresponding point N2' on the distance portion correction surface FC2 has a surface power at the corresponding point F2', the surface power of the near portion correction surface NC2 is uniformly offset over the entire surface thereof so that the surface power becomes substantially zero at the corresponding point F2'.

During defining of the near portion correction surface NC2, the manufacturing section computer 204 calculates an addition ADDH in the lateral direction of the near portion correction surface NC2, and multiplies the entire near portion correction surface NC2 by a factor (DHn'/ADDH). As a result, the near portion correction surface NC2 is defined as a surface having the surface power DHn2' in the lateral direction at the corresponding point N2' of the near portion measurement point N2.

S36 of FIG. 6 (Calculation of Molding Surface after Correction (for molding of an object side surface))

For each of the design surface of the molding surface 302 (for molding of an object side surface), the distance portion correction surface FC1 and the near portion correction surface NC1, the manufacturing section computer 204 calculates curvature distributions in a predetermined cross sectional direction and combines the curvature distributions, and smoothes the combined curvature distribution, for example, using a one-dimensional B-Spline function. The manufacturing section computer 204 integrates the smoothed curvature distribution to calculate the inclination distribution in the predetermined cross sectional direction. The inclination of the molding surface 302 (for molding of an object side surface) at the geometrical center (the geometrical center of the eyeglass lens) is set as zero. The manufacturing section computer 204 executes numerical integration by Gauss-Legendre algorithm for the inclination distribution obtained by the calculation. As a result, the height distribution in the predetermined cross sectional direction of the corrected molding surface 302 (for molding of an object side surface) with respect to the height (height of 0) in the Z-direction of the molding surface 302 (for molding of an object side surface) at the geometrical center is obtained. The manufacturing section computer 204 executes the above described series of calculation for the predetermined cross sectional direction, and obtains the height data in the Z-direction at each XY position of the molding surface 302 (for molding of an object side surface), i.e., the shape data of the corrected molding surface 302 (for molding of an object side surface), by executing interpolation using, for example, Spline interpolation, for the height distribution in each cross sectional direction.

S37 of FIG. 6 (Calculation of Molding Surface after Correction (for Molding of Eye Side Surface))

For each of the design surface of the molding surface 302 (for molding of an eye side surface), the distance portion correction surface FC2 and the near portion correction surface NC2, the manufacturing section computer 204 calculates curvature distributions in a predetermined cross sectional direction and combines the curvature distributions, and smoothes the combined curvature distribution, for example, by a one-dimensional B-Spline function. The manufacturing section computer 204 integrates the smoothed curvature distribution to calculate the inclination distribution in the predetermined cross sectional direction. The inclination of the molding surface 302 (for molding of an eye side surface) at the geometrical center (the geometrical center of the eyeglass lens) is zero as in the case of the molding surface 302 (for molding of an object side surface). The manufacturing section computer 204 executes numerical integration by Gauss-Legendre algorithm for the inclination distribution obtained by the calculation. As a result, the height distribution in the predetermined cross sectional direction of the corrected molding surface 302 (for molding of an eye side surface) with respect to the height (height of 0) in the Z-direction of the molding surface 302 (for molding of an eye side surface) at the geometrical center is obtained. The manufacturing section computer 204 executes the above described series of calculation for the predetermined cross sectional direction, and obtains the height data in the Z-direction at each XY position of the molding surface 302 (for molding of an eye side surface), i.e., the shape data of the corrected molding surface 302 (for molding of an eye side surface), by executing interpolation using, for example, Spline interpolation, for the height distribution in each cross sectional direction.

S38 of FIG. 6 (Processing of Molding Surface Based on Corrected Shape Data)

The manufacturing section computer 204 executes predetermined formal processing, such as addition of a shape required for processing to the periphery of each corrected molding surface 302, and then controls the processing machine 206 to make again the pair of glass mold dies 300 for molding of object side and eye side surfaces. Thus, in the manufacturing section, the try and error is repeated until the error amount at each evaluation point falls within the tolerance using the manufacturing section computer 204 and the processing machine 206.

According to the example 2, for each of the molding surface 302 for molding of an object side surface and the molding surface 302 for molding of an eye side surface, the correction amount for correcting the error amount with respect to the design value is defined as an independent correction surface. Since each correction surface is defined as a surface which mathematically stands, no breaking of optical performance occurs in the correction shape of the molding surface 302 obtained by combining each surface. In contrast to the conventional design concept where correction is made to simultaneously satisfy desired prescription at a plurality of evaluation points, it is possible to simply define the correction surface without causing breaking of the optical performance because the correction surface is defined while focusing on correction at a single evaluation point.

Mores specifically, in the example 2, the error amount at each evaluation point (corresponding point) is divided into a plurality of components (in the vertical direction component and the lateral direction component), each correction surface of the molding surface 302 (for molding of an object side surface) is independently defined for each evaluation point based on the error amount in the vertical direction, and each correction surface of the molding surface 302 (for molding of an eye side surface) is independently defined for each evaluation point based on the error amount in the lateral direction. Since the optimum correction surface can be defined for each direction component, the precision of the shape correction is enhanced and the number of times for trial and error can be decreased.

The foregoing is the embodiment of the invention. Embodiments according to the invention are not limited to the above described examples, and various types of variations can be made within the scope of the technical concept of the invention. For example, examples and variations described herein by way of illustration or modifications thereof may be combined in an appropriate manner.

In the above described embodiments, it is explained that after the ordering data is received from the eyeglass store 10, design and manufacturing of the glass mold die 300 and manufacturing of the glass mold 500 and the eyeglass lens are performed in the eyeglass lens factory 20. However, in another embodiment, the glass mold die 300 and the glass mold 500 may be manufactured in advance of selling of products (eyeglass lenses). In this case, in the eyeglass lens factory 20, a pair of optimal glass molds are selected based on the prescriptions included in the ordering data received from the eyeglass store 20, from among glass molds which have been manufactured in advance, and thereafter, manufacturing of the eyeglass lens is performed. In the former case (in the above described embodiment), it is possible to manufacture the eyeglass lens more suitable for the prescriptions of a wearer, and in the latter case (in the variation described here) it is possible to shorten the lead time from ordering to delivery.

In another embodiment, in addition to the glass mold die 300 and the glass mold 500, the manufacturing of the eyeglass lens may be performed in advance of receipt of an order. In this case, in the eyeglass lens factory 20 (or in the eyeglass store 10), an eyeglass lens optimal for the prescriptions for an wearer is selected from among an eyeglass lens group which has been manufactured in advance, and an optimal eyeglass lens for the prescriptions for an wearer is selected, and the eyeglass lens is delivered to the wearer, for example, after framing.

In the above described example 2, the correction amount in the vertical direction is assigned to the distance portion correction surface FC1 and the near portion correction surface NC1, and the correction amount in the lateral direction is assigned to the distance portion correction surface FC2 and the near portion correction surface NC2. However, another pattern for assigning correction amount can be defined. For example, the correction amount in the vertical direction and the lateral direction may be assigned to the distance portion correction surface FC1 (e.g., the distance portion correction surface FC1 is a toric surface), the correction amount in the vertical direction may be assigned to the near portion correction surface NC1, and the correction amount in the lateral direction may be assigned to the near portion correction surface NC2 (without defining the distance portion correction surface FC).

What is claimed is:

1. A manufacturing method for a mold die used in a molding process for obtaining a mold used to form an eyeglass lens having at least first and second reference points and having an area where power continuously changes, wherein, in the molding process, a glass material placed on a molding surface of the mold die is softened by heat to form an upper surface of the glass material by letting a lower surface of the glass material closely contact the molding surface, the manufacturing method comprising:
a design data making step of making design data for the molding surface of the mold die based on predetermined prescription information;
a molding surface creation step of creating the molding surface in accordance with the design data;
an error amount specifying step of specifying error amounts at first and second corresponding points defined on the created molding surface respectively corresponding the first and second reference points, with respect to design values by the design data;

a first correction surface defining step of defining a first correction surface based on an error amount specified at the first corresponding point;

a second correction surface defining step of defining a second correction surface based on the first correction surface and an error amount specified at the second corresponding point, wherein power of the second correction surface at the first corresponding point is substantially zero;

a design data correction step of combining a design surface by the design data, the first correction surface and the second correction surface, and correcting the design data based on combined data after the combining; and a corrected surface creation step of creating the molding surface in accordance with the corrected design data, wherein, in the second correction surface defining step, the second correction surface is defined such that:

a power at the second corresponding point is defined as a value obtained by subtracting a power at the second corresponding point on the first correction surface from the error amount at the second corresponding point; and the entire second correction surface is offset so that the power at the first corresponding point becomes substantially zero.

2. A manufacturing method for a mold, comprising:

an arranging step of arranging a glass material on a molding surface of a mold die manufactured according to claim 1; and a manufacturing step of softening the glass material arranged on the molding surface of the mold die by heat, forming an upper surface of the glass material by letting a lower surface of the glass material closely contact the molding surface, and manufacturing the mold having a transferring surface for forming an eyeglass lens having an area in which power continuously changes.

3. A manufacturing method for an eyeglass lens, comprising:

a defining step of arranging a pair of molds, at least one of which is manufactured according to claim 2, to face with each other, and defining a cavity by sealing a gap between the pair of molds with a sealing member;

an injection step of injecting a lens material liquid into the cavity;

a hardening reaction step of causing the lens material liquid injected into the cavity to induce a hardening reaction, and obtaining an eyeglass lens base to which each of transferring surface shapes of the pair of molds is transferred; and a mold release step of releasing the eyeglass lens base, to which each of the transferring surface shapes is transferred, from the pair of molds.

4. A manufacturing method for a mold die used in a molding process for obtaining a mold used to form an eyeglass lens having at least first and second reference points and having an area where power continuously changes, wherein, in the molding process, a glass material placed on a molding surface of the mold die is softened by heat to form an upper surface of the glass material by letting a lower surface of the glass material closely contact the molding surface, the manufacturing method comprising:

a design data making step of making design data for the molding surface of the mold die based on predetermined prescription information;

a molding surface creation step of creating the molding surface in accordance with the design data;

an error amount specifying step of specifying error amounts at first and second corresponding points defined on the created molding surface respectively corresponding the first and second reference points, with respect to design values by the design data;

a first correction surface defining step of defining a first correction surface based on an error amount specified at the first corresponding point;

a second correction surface defining step of defining a second correction surface based on the first correction surface and an error amount specified at the second corresponding point, wherein power of the second correction surface at the first corresponding point is substantially zero;

a design data correction step of combining a design surface by the design data, the first correction surface and the second correction surface, and correcting the design data based on combined data after the combining; and a corrected surface creation step of creating the molding surface in accordance with the corrected design data, wherein, in at least one of the first correction surface defining step and the second correction surface defining step, at least one of the first correction surface and the second correction surface is divided into a first divided correction surface and a second divided correction surface, the first divided correction surface is defined based the error amount at one of the first and second corresponding points in a vertical direction, the second divided correction surface is defined based the error amount at the one of the first and second corresponding points in a lateral direction, and wherein, in the design data correction step, the first divided correction surface and the second divided correction surface are combined with the design surface, in place of the at least one of the first correction surface and the second correction surface.

5. The manufacturing method for a mold die according to claim 4, wherein:

in the first correction surface defining step, the first correction surface is defined as a toric surface;

in the second correction surface defining step, the second correction surface is divided into the first divided correction surface defined based on the error amount at the second corresponding point in the vertical direction and the second divided correction surface defined based on the error amount at the second corresponding point in the lateral direction.

6. The manufacturing method for a mold die according to claim 4, wherein, in the design data correction step, curvature distributions of the design surface, the first correction surface and the second correction surface are obtained and combined, and the corrected design data is created as height data at each position on the molding surface with respect to a predetermined reference position based on the combined curvature distribution.

7. A manufacturing method for a pair of mold dies used in a molding process for obtaining a pair of molds used to form a progressive power lens of a double side combination type in which a progressive power component in a vertical direction is assigned to an object side surface and a progressive power component in a lateral direction is assigned to an eye side surface, wherein the progressive power lens has at least first and second reference points, and wherein, in the molding process, a glass material placed on a molding surface of the mold die is softened by heat to form an upper surface of the glass material by letting a lower surface of the glass material closely contact the molding surface, the manufacturing method comprising:

a design data making step of making design data for each of the molding surfaces of the pair of mold dies based on predetermined prescription information;

a molding surface creation step of creating each of the molding surfaces of the pair of mold dies in accordance with the design data;

an error amount specifying step of specifying error amounts at first and second corresponding points, which are defined on the each of the created molding surfaces and correspond respectively to the first and second reference points, with respect to design values by the design data;

a dividing step of dividing an error amount at each of the first and second corresponding points on each of the molding surfaces of the pair of mold dies into a vertical component and a lateral component;

a first correction surface defining step of defining a first correction surface corresponding to one of the molding surfaces based on a first added error amount obtained by adding together an error amount in the vertical direction at the first corresponding point on the one of the molding surfaces and an error amount in the vertical direction at the first corresponding point on the other of the molding surfaces;

a second correction surface defining step of defining a second correction surface corresponding to the one of the molding surfaces based on a second added error amount obtained by adding together an error amount in the vertical direction at the second corresponding point on the one of the molding surfaces and an error amount in the vertical direction at the second corresponding point on the other of the molding surfaces;

a third correction surface defining step of defining a third correction surface corresponding to the other of the molding surfaces based on a third added error amount obtained by adding together an error amount in the lateral direction at the first corresponding point on the one of the molding surfaces and an error amount in the lateral direction at the first corresponding point on the other of the molding surfaces;

a fourth correction surface defining step of defining a fourth correction surface corresponding to the other of the molding surfaces based on a fourth added error amount obtained by adding together an error amount in the lateral direction at the second corresponding point on the one of the molding surfaces and an error amount in the lateral direction at the second corresponding point on the other of the molding surfaces;

a first design data correction step of combining a design surface by the design data of the one of the molding surfaces, the first correction surface and the second correction surface, and corrects the design data of the one of the molding surfaces based on combined data after the combining;

a second design data correction step of combining a design surface by the design data of the other of the molding surfaces, the third correction surface and the fourth correction surface, and corrects the design data of the other of the molding surfaces based on combined data after the combining; and a corrected surface creation step of creating each of the molding surfaces of the pair of mold dies in accordance with the corrected design data of each of the molding surfaces.

8. The manufacturing method for a pair of mold dies according to claim 7, wherein:

the one of the molding surfaces corresponds to an object side surface of the progressive power lens of a double side combination type; and the other of the molding surfaces corresponds to an eye side surface of the progressive power lens of a double side combination type.

9. The manufacturing method for a pair of mold dies according to claim 7, wherein:

in the second correction surface defining step, the second correction surface is defined such that power of the second correction surface at the first corresponding point is substantially zero and is defined based on the first correction surface and the second added error amount; and in the fourth correction surface defining step, the fourth correction surface is defined such that power of the fourth correction surface at the first corresponding point is substantially zero and is defined based on the third correction surface and the fourth added error amount.

10. The manufacturing method for a pair of mold dies according to claim 9, wherein:

in the second correction surface defining step, the second correction surface is defined such that power in the vertical direction at the second corresponding point is set as a value obtained by subtracting the first added error amount from the second added error amount, and that the entire second correction surface is offset to have power of substantially zero at the first corresponding point; and in the fourth correction surface defining step, the fourth correction surface is defined such that power in the lateral direction at the second corresponding point is set as a value obtained by subtracting the third added error amount from the fourth added error amount, and that the entire fourth correction surface is offset to have power of substantially zero at the first corresponding point.

11. The manufacturing method for a pair of mold dies according to claim 7, wherein, in the first design data correction step, curvature distributions of the design surface by the design data of the one of the molding surfaces, the first correction surface and the second correction surface are obtained and combined, and the corrected design data of the one of the molding surfaces is created as height data at each position on the one of the molding surfaces with respect to a predetermined reference position based on the combined curvature distribution, wherein, in the second design data correction step, curvature distributions of the design surface by the design data of the other of the molding surfaces, the third correction surface and the fourth correction surface are obtained and combined, and the corrected design data of the other of the molding surfaces is created as height data at each position on the other of the molding surfaces with respect to a predetermined reference position based on the combined curvature distribution.

12. A manufacturing method for a mold, comprising:
- an arranging step of arranging a glass material on each of the molding surfaces of the pair of mold dies manufactured according to claim 7; and
- a manufacturing step of softening the glass material arranged on each of the molding surfaces by heat, forming an upper surface of the glass material by letting a lower surface of the glass material closely contact the each of the molding surfaces, manufacturing, using one of the pair of mold dies, a mold having a transferring surface for forming an object side surface of a progressive power lens of a double side combination type, and manufacturing, using the other of the pair of mold dies, a mold having a transferring surface for forming an eye side surface of the progressive power lens of a double side combination type.

13. A manufacturing method for an eyeglass lens, comprising:
- a defining step of arranging a pair of molds, which is manufactured according to claim 12, to face with each other, and defining a cavity by sealing a gap between the pair of molds with a sealing member;
- an injection step of injecting a lens material liquid into the cavity;
- a hardening reaction step of causing the lens material liquid injected into the cavity to induce a hardening reaction, and obtaining an eyeglass lens base to which each of transferring surface shapes of the pair of molds is transferred; and
- a mold release step of releasing the eyeglass lens base, to which each of the transferring surface shapes is transferred, from the pair of molds.

\* \* \* \* \*